(12) United States Patent
Tanhua et al.

(10) Patent No.: US 8,960,022 B2
(45) Date of Patent: Feb. 24, 2015

(54) DEVICE FOR DETECTING THE PRESENCE OF AT LEAST ONE HUMAN FINGER ON SURFACE, AND A METHOD OF USING THE DEVICE IN THE USER INTERFACE OF A MACHINE, A DEVICE (IN PARTICULAR A PORTABLE DEVICE), OR A SYSTEM

(75) Inventors: Sakari Tanhua, Espoo (FI); Kasper Rönning, Espoo (FI); Pauli Laitinen, Helsinki (FI)

(73) Assignee: Aito B.V. (NL)

( * ) Notice: Subject to any disclaimer, the term of this patent is extended or adjusted under 35 U.S.C. 154(b) by 49 days.

(21) Appl. No.: 13/703,709

(22) PCT Filed: Jun. 8, 2011

(86) PCT No.: PCT/IB2011/052501
§ 371 (c)(1),
(2), (4) Date: Dec. 12, 2012

(87) PCT Pub. No.: WO2011/158154
PCT Pub. Date: Dec. 22, 2011

(65) Prior Publication Data
US 2013/0086997 A1 Apr. 11, 2013

Related U.S. Application Data

(60) Provisional application No. 61/354,713, filed on Jun. 15, 2010.

(51) Int. Cl.
*G01L 1/00* (2006.01)
*G01L 5/00* (2006.01)
(Continued)

(52) U.S. Cl.
CPC ............ *G01L 1/16* (2013.01); *G06F 3/0414* (2013.01)
USPC ................................. 73/862.541; 73/862.381

(58) Field of Classification Search
USPC ..................................................... 73/862.541
See application file for complete search history.

(56) References Cited

U.S. PATENT DOCUMENTS

| | | | |
|---|---|---|---|
| 2005/0193823 A1* | 9/2005 | Amano | 73/704 |
| 2008/0007532 A1* | 1/2008 | Chen | 345/173 |

(Continued)

FOREIGN PATENT DOCUMENTS

| | | |
|---|---|---|
| DE | 102004046526 | 4/2006 |
| EP | 1571585 | 9/2005 |
| WO | WO 0122587 | 3/2001 |

OTHER PUBLICATIONS

International Search Report for PCT Application PCT/IB2011/052501, EPO, Dec. 22, 2011.
(Continued)

*Primary Examiner* — Lisa Caputo
*Assistant Examiner* — Jamel Williams
(74) *Attorney, Agent, or Firm* — Bourque and Associates, PA

(57) ABSTRACT

A device for detecting the likelihood of the presence of at least one human finger on a surface, and a method of using the device in the user interface of a machine, device or system. The device comprises at least one element having piezoelectric characteristics, located under a surface, the element arranged in the device in such a manner that a force when exerted on the surface, such as when the surface is pressed by finger, is transferred to mechanical stress of the element, the element then producing a voltage output in response to the mechanical stress. Also included are means for measuring the voltage output in a predefined time period and means for determining the degree of stability of the measured voltage output, and configured to indicate whether or not the degree of stability shows that the measured voltage output is likely to be a human finger or not.

28 Claims, 2 Drawing Sheets

(51) Int. Cl.
    *G01L 1/16*           (2006.01)
    *G06F 3/041*         (2006.01)

(56) References Cited

U.S. PATENT DOCUMENTS

2008/0070338 A1*   3/2008   Zribi et al. ..................... 438/48
2008/0204417 A1*   8/2008   Pierce et al. ................. 345/168
2009/0002199 A1*   1/2009   Lainonen et al. ............... 341/20
2009/0148962 A1*   6/2009   Lu et al. ........................... 438/3
2010/0053087 A1*   3/2010   Dai et al. ...................... 345/168
2013/0049545 A1*   2/2013   Zou et al. ...................... 310/346

OTHER PUBLICATIONS

International Preliminary Report on Patentability in PCT Application PCT/IB2011/052501, EPO, Jun. 25, 2012.

* cited by examiner

DEVICE FOR DETECTING THE PRESENCE OF AT LEAST ONE HUMAN FINGER ON SURFACE, AND A METHOD OF USING THE DEVICE IN THE USER INTERFACE OF A MACHINE, A DEVICE (IN PARTICULAR A PORTABLE DEVICE), OR A SYSTEM

FIELD OF THE INVENTION

The present invention has been made in the field of sensor technology, more specifically, touch sensors.

TECHNICAL BACKGROUND

Machines, devices, the latter in particular including also portable devices, and also different kinds of systems may have one or more user interfaces that the operator of the device, or user, can touch in order to control the device. User interfaces most typically have a surface that may be flat or curved.

It is known to detect the touch or presence of a human finger to the surface of a user interface. In particular, touch sensors comprising piezoelectric materials have gained in popularity in the recent years. However, they cannot accurately and reliably detect whether a physical contact between a human finger and the touch sensor exists at a given moment or not.

SUMMARY OF THE INVENTION

It is therefore an objective of the present invention to improve accuracy and reliability of a device for detecting the presence of at least one human finger on a surface.

This objective can be achieved by using the device according to independent claim 1, and the method according to independent claim 13.

The dependent claims describe advantageous aspects of the device and the method.

A device for detecting the presence of at least one human finger on a surface comprises at least one element having piezoelectric characteristics. The element is located under a surface that is visible. Furthermore, the element has been arranged in the device in such a manner that a force when exerted on the surface, such as when the surface is pressed by finger, is transferred to mechanical stress of the element. The element produces a voltage output in response to the mechanical stress.

The device comprises also means for measuring the voltage output in a predefined time period, and also means for determining the degree of stability of the measured voltage output that are configured to indicate that:
i) if the degree of stability shows that the measured voltage output is highly stable, or at least sufficiently stable, a physical contact between a human finger and the surface does not exist; and
ii) if the degree of stability shows that the measured voltage output is not stable but contains vibrations characteristic to a human finger, a physical contact between a human finger and the surface does exist.

The means for determining the degree of stability of the measured voltage output are most advantageously adapted to i) collect voltage output samples over a time interval, ii) compute an error measure for the voltage output samples, and iii) compare an error measure against a predefined threshold. If the error measure does not exceed the predefined threshold, there is no physical contact. In any other case, there is a physical contact. The error measure can in a simple implementation be the square sum of the samples' distance from average of the samples.

In the method of using a device in the user interface of a machine, device (in particular a portable device), or of a system, the device is used to indicate whether a physical contact between a human finger and the surface of the user interface exists or not.

With the device according to the invention, it is now possible to reliably detect whether at least one human finger really touches the surface of the user interface i.e. whether there is a physical contact between at least one human finger and the surface.

The method according to the invention can improve the accuracy or reliability of the machine, device or system in which the method is being used, since so the probability of a false interpretation of the presence of at least one human finger on the surface can be reduced.

If, in the device, the element having piezoelectric characteristics is arranged between an upper conductive layer that is attached to the surface from below the surface, and a lower conductive layer that is attached to a base plate, the upper conductive layer serves as an electrical contact to a top electrode of the element and the lower conductive layer serves as electrical contact to the bottom of the element, the electrical contacting can be implemented from both sides of the element. This is particularly important bearing in mind that a force that is to be exerted in the surface must be transferred to a voltage output.

If the upper conductive layer is a conductive foil, the transfer of the force that is exerted via the surface to the element may be impaired as little as possible.

If the lower conductive layer is a copper layer, it can be used not only to provide an electrical contact and easy connectability to further circuitry of the device, but can also act as a mechanical support. The copper layer preferably has a gold plating to improve corrosion resistance and so improves the electrical contact.

If the lower conductive layer encompasses a hole or a recess, providing enough room for part of the element under mechanical stress, while the region in the lower conductive layer directly limiting to the edge of the hole or recess acts as a support surface for the edge of the element, the mechanical stress can be employed to have a plastic deformation in the element, while also providing a limit the element can bend, protecting it against overload.

A particularly advantageous manufacturing form for the hole or recess is if the hole or recess is circular, since circular piezoelectric elements are low-cost, readily available and easy to place when the apparatus is assembled, because the rotational orientation is insignificant.

The element having piezoelectric characteristics most preferably is or comprises a ceramic piezoelectric element, a crystal piezoelectric element, or a polymer construction that exhibits piezoelectric characteristics.

In the preferred embodiment of the invention, the element is arranged in the device in such a manner that a force, when exerted in the surface, such as when the surface is pressed by finger, is transferred to mechanical stress of the element by bending the element. Then by suitably selecting the distance between the surface and the element, their dimensions and quality of the material used for the surface, it can be chosen how much force must be exerted on the surface before an appropriate voltage output is obtained.

Most practically, the means for measuring the voltage output in a predefined time period and the means for determining the degree of stability of the measured voltage output comprise a microcontroller which further comprises an analog-to-digital converter for converting the voltage output which is an analog signal to a digital signal which is then analyzed using software algorithms in the microcontroller. In this manner, the device can be implemented as an automatic device. Currently, such microcontrollers are relatively powerful and do not require much power to operate and are therefore a commercially interesting option.

The device is most preferably a sensor or a part of a sensor.

According to an advantageous aspect of the method, the device can be used to accomplish a capacitive touch sensor which is adapted to detect the presence of a human finger, an inductive touch sensor which is adapted to sense the human touch by measuring the change in forces projected to the surface of the user interface, or a piezoelectric touch sensor which reacts to changes of forces and is adapted to sense the human touch by measuring the change in forces projected to the surface of the user interface. When the method is being used for any of these purposes, some of the intrinsic problems of the sensors of the kinds in the list can be alleviated. Such problems include operational characteristics such as inaccuracy or unreliability to distinguish whether a physical contact between a human finger and the sensor exists at a given moment or not. In this manner, the usability of the sensors for different purposes can be extended.

A particularly advantageous aspect of the method is, when in the method, the device is used to signal the beginning and the end of a human finger interaction with the user interface and preferably also to measure insertion force which corresponds to the force with which the at least one finger presses the surface. This has not been possible with touch sensors according to state of the art. In addition, the same device can also measure the insertion force. It has not been possible to both measure the insertion force and signal the beginning and the end of a human finger interaction with the user interface.

BRIEF DESCRIPTION OF THE DRAWINGS

In the following, the invention is described in more detail with the examples shown in the accompanying drawings, of which.

DETAILED DESCRIPTION

A human finger has the tendency to slightly vibrate when pressed against a surface. By sensing this vibration it is possible to determine whether a physical contact exists.

By measuring the vibrations exerted by a human finger to a surface, a device and method can be used to sense whether a physical contact between a human finger and a surface exists.

The preferred mechanical construction utilizes piezoelectric elements for sensing the forces caused by the vibration, but the invention is not limited to any particular way of measuring the exerted forces.

In a first known application, capacitive sensing technology detects the presence of a human finger but is unable to detect whether the finger is actually touching the surface or is close to it.

In a second known application, non-capacitive technologies such as piezoelectric elements or inductive elements are used to sense the human touch by measuring the change in forces projected to the surface of the user interface. Many of these technologies only react to change in forces instead of being able to measure the static force. Therefore they have limited accuracy and reliability in detecting the beginning and end of a human finger interaction.

In a third known application, a user interface sends haptic feedback to a human finger for generating a sensational feeling to the user. In order for most haptic feedback technologies to function a physical contact between the surface and the human finger is required. Thus a haptic feedback system benefits greatly from being able to send the haptic feedback only after a physical contact for the finger is present.

The present device and method are not limited to any of the aforementioned applications; the aforementioned applications however serve as particular examples where the present device and method can be utilized.

The device 1 comprises one or more piezoelectric elements 22. A piezoelectric element 22 produces an electric voltage in response to changes in mechanical stress applied to it. When the mechanical stress of a piezoelectric element is varied, the output voltage of the element 22 varies correspondingly. When the mechanical stress of a piezoelectric element is static and does not vary, the output voltage of the piezoelectric element is constant.

Figure 1:
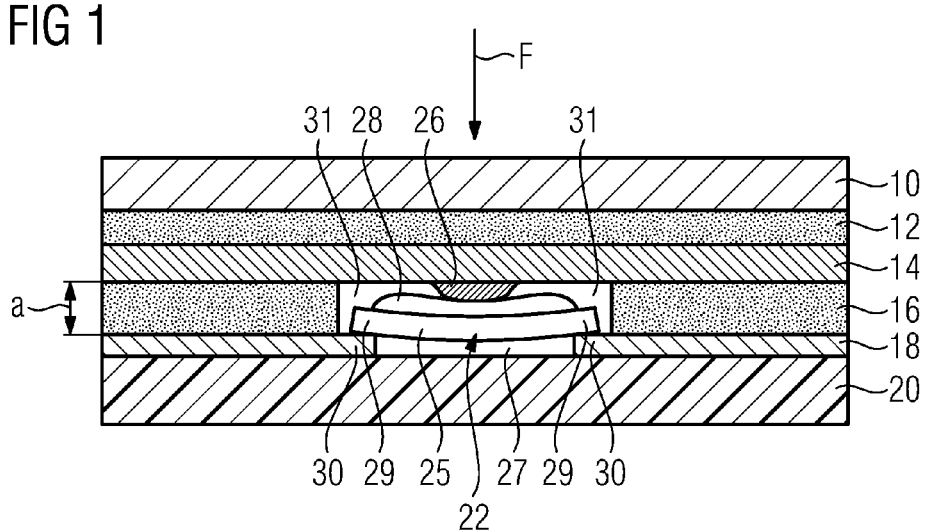
FIG. 1 is a side view of an example mechanical construction of the preferred embodiment of the device, corresponding to a cross section view of a device that is put in production.

Referring now to the structure of the device 1 in more detail, FIG. 1 shows an example mechanical construction for attaching a piezoelectric element 22 into a surface 10 such that when perpendicular force F is applied to the surface 10, the force is utilized to mechanically stress the piezoelectric element 22 by bending it.

The base plate 20 provides support for the stack of layers on top of it. In the example construction, the base plate 20 is a printed circuit board manufactured of glass reinforced epoxy laminate sheet (also known as FR4 material). Attached on top of it there is most preferably a 90 μm gold plated copper layer 18 that provides both an electrical connection to the bottom of the piezoelectric element 22 and enough room for the piezoelectric element 22 to bend downwards. For the copper layer 18, other thicknesses can be used as well, most advantageously between 20 μm and 1 mm, but 90 μm is particularly suitable providing protection against overload and enough room for bending, and being possible to produce with standard printed circuit board processes. Gold plating improves the reliability of electrical contact but is not mandatory.

In particular when a circular piezoelectric element 22 is used, a circular hole 27 is etched into the copper layer 18 with a slightly smaller diameter to support the piezoelectric element from the sides. As a result, there will be a recess on the top of the base plate 20-copper layer 18-combination. Most preferably, no hole or recess is made in the base plate 20.

The piezoelectric element 22 comprises a circular layer 28 of piezoelectric material sintered on metallic base plate 25 that most preferably comprises or consists of brass or stainless steel and has a larger diameter than the layer 28 of piezoelectric material.

The dot 26 is not directly part of the piezoelectric element 22, since it is screen printed to the conductive foil 14 to induce pretension and secure the contact, thus improving the sensitivity of the device 1. The purpose of the dot 26 is also to ensure electrical contact between the piezoelectric element 22 and the conductive foil 14, since a) thickness tolerances vary and b) since heat coefficients are different between adhesive and piezo elements. The device 1 works also without the dot 26 but its reliability as regarding different tolerances can be improved much by using the dot 26.

Alternatively, the dot 26 may be on the other side of the conductive foil 14 or even in a different layer. If the dot 26 is located as shown in FIG. 1, it is preferably either a) comprise conductive material or be made of conductive material, or b) be covered with conductive material. For the preferred embodiment, we have chosen to cover the dot 29 with screen printed silver to make its outer surface conductive.

The layer 28 of piezoelectric material may be circular but it can have any other form as well. In particular, it was recently found out that the most advantageous form for the layer 28 of piezoelectric material is if it has a triangular shape. We have used oval shapes or shapes close to oval as well, since so it was possible for us to reach the most realistic haptic user experience with the device 1.

The piezoelectric element 22 is enclosed in hole 31 within an adhesive layer 16. The height a of the adhesive layer 16 is the same as the height of the piezoelectric element 22. The thickness of the base plate 25 and the layer 28 of piezoelectric material is slightly lower than the height a of the adhesive layer. The total thickness of the base plate 25 the layer 28 of piezoelectric material and of the dot 26 (when it is uncompressed) is slightly larger than the thickness a of the adhesive layer 16 in order to obtain pretension.

On top of the piezoelectric element 22 is a conductive foil 14 that provides electrical contact to the top electrode of the piezoelectric element 22. The conductive foil 14 is attached to the surface 10 by an adhesive layer 12. The surface 10 is visible to the user.

When a force F is applied to the mechanical construction in FIG. 1, the piezoelectric element 22 starts to bend (FIG. 1 shows the piezoelectric element 22 in bent state). When the force F is removed, the layered construction returns to its original non-bent state (the piezoelectric element 22 in FIG. 1 would be shown as straight). Bending is one form of mechanical stress, and so the piezoelectric element 22 produces a voltage between the copper layer 18 and the conductive layer 14. The copper layer 18 and the conductive layer 14 are connected to a measurement equipment such as a microcontroller for measuring the voltage.

The device 1 is not limited to the shown construction and not limited to the use of a separate piezoelectric element 22. As the element 22 of the device 1 ceramic piezoelectric elements, crystal piezoelectric elements or a polymer construction that exhibit piezoelectric characteristics may be used. Any construction is suitable that transfers the applied mechanical force F into a mechanical stress of the piezoelectric material.

When the surface 10 in FIG. 1 is not touched by a human finger, i.e. the applied force F is zero, the mechanical construction is steady and the voltage output of the piezoelectric element 22 is steady. When the surface 10 is being touched by a human finger, the finger exerts varying forces F to the surface 10 during the time the finger is physically against the surface 10. Due to the nature of a human finger, the finger has a tendency to slightly vibrate even when kept as steadily as possible. This varying force F cause the voltage output of the piezoelectric element 22 to vary in time. By measuring the amount of variation in the voltage output of the piezoelectric element 22 in a certain time period, it can be detected whether a human finger is being touching the surface, i.e. whether a physical contact exists between the human finger and the surface.

Figure 2:
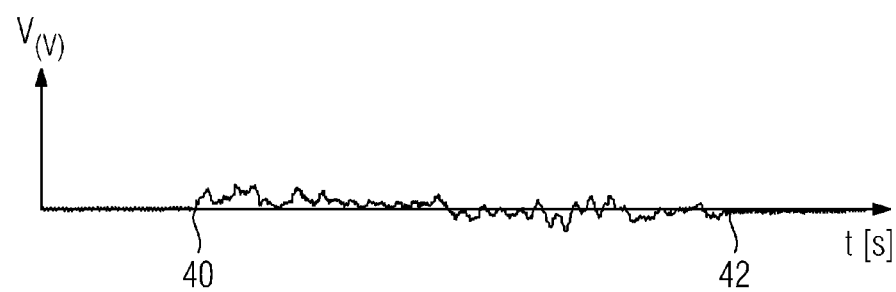
FIG. 2 is a plot of actual measurement data of an example system.

An example of actual measurement data is shown in FIG. 2. The X axis of the plot denotes time and the Y axis denotes the measured voltage. Before point 40 no force F was applied to the surface 10 and so the mechanical construction and the output voltage was stable. At point 40 a human finger was placed onto the surface 10 such that a physical contact was present. Due to the nature of a human finger, the finger vibrated and caused a time-varying force F and thus time-varying bending of the piezoelectric element 22. From the plot in FIG. 2 it can be clearly seen that the signal became erratic after point 40.

At point 42 the finger was lifted off of the surface 10. As soon as the physical contact between the finger and the surface 10 was lost at point 42, the applied force F became zero and the output voltage of the piezoelectric element 22 became steady.

By measuring the stability of the output voltage of the piezoelectric element 22 using a suitable electrical circuit, it can be determined whether a human finger has a physical contact to the surface 10. The example in FIG. 2 was recorded using an electrical circuit as shown in FIG. 3.

Figure 3:
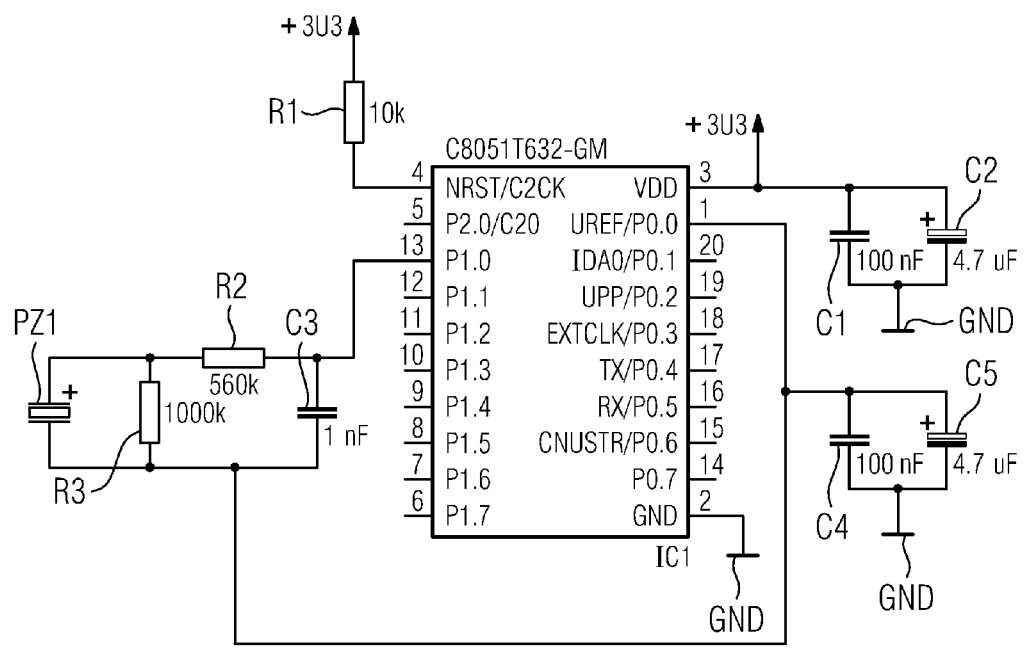
FIG. 3 is an electrical connection diagram for the example measurement system.

The electrical circuit shown in FIG. 3 is an example embodiment of a measurement system but the invention is not limited to this particular way of measuring the sensor element. The microcontroller IC1 contains software algorithms for measuring the output signal of the piezoelectric element PZ1 using the analog-to-digital converter of the microcontroller IC1. The output signal of the piezoelectric element PZ1 is in the simplest implementation the voltage V caused by the layer 28 of piezoelectric material lead through the conductive layers 14 and 18 to the microcontroller IC1.

The algorithms analyze the measured signal and determine its degree of stability. If the signal is highly stable, or at least sufficiently stable, physical contact between a human finger and the surface 10 does not exist. If the signal is not stable but contains vibrations characteristic to a human finger, a physical contact between a human finger and the surface 10 does exist.

The output signal of the piezoelectric element PZ1 was measured via input P1.0 of the microcontroller IC1 with resistors R2 and R3 and capacitor C3 as shown in FIG. 3. An offset voltage was generated inside the microcontroller IC1 and output from pin UREF/P0.0. The offset voltage was half of the maximum voltage the analog-to-digital converter can measure. This offset voltage is conducted to input P1.0 via resistors R3 and R2. When the force F is zero, the voltage at input P1.0 is the same as the offset voltage. When the force F is varying, the piezoelectric element PZ1 produces a varying voltage over the resistor R3 and changes the voltage at input P1.0 by the same amount. This construction allows the unipolar analog-to-digital converter to measure bipolar (positive and negative) voltage levels produced by the piezoelectric element PZ1.

The active low reset input NRST was driven from the +3.3 V power source via resistor R1. This causes the microcontroller IC1 go out of reset and start running once the operating level rises to proper level during power-up. Operating power for the microcontroller IC1 was obtained from a power source over a connection grounded via and stabilized by capacitors C1 and C2 and fed to operating power input VDD.

A simple yet effective example implementation of a software algorithm to determine whether the output signal from the piezoelectric element 22 is highly stable or, at least, sufficiently stable, works as follows:

The piezoelectric element 22 voltage is sampled with analog-to-digital converter at sampling frequency R, for example R=250 Hz. The sampled values for the last T seconds, for example, T=0.1 s, are stored in memory. The number N of most recent samples in memory is thus N=T R, which in our example would be 25.

After each sampling by the analog-to-digital converter, the following calculations are performed:

The sum S of the most recent samples Xn in memory is calculated by $$S = X1 + X2 + X3 + \ldots + X25. \quad (1)$$

An arithmetic mean M of the samples in memory is calculated by $$M = S/N. \quad (2)$$

For each sample Xn in memory, the error En is calculated by $$En = (Xn - M)^2. \quad (3)$$

The error En calculated by equation (3) is the difference of each sample from the arithmetic mean and raises the difference in square (i.e. power two) thick causes higher differences to have exponentially more influence, and also ignores the sign of the difference.

The total error E is calculated as the sum of all sample errors:

$$E = E1 + E2 + E3 + \ldots + E25. \quad (4)$$

After each analog-to-digital sampling, the total error E indicates the stability of the signal. When the surface is not being contacted by a human finger, the total error E is low, for example E=25, consisting of measurement noise.

A human finger, when having a physical contact with the surface 10, characteristically causes a highly erratic signal with distinct spiking. There is no single parameter to describe the signal, but the frequency of the spiking is roughly 20 Hz. When a slight contact exists between a human finger and the surface, i.e. the force F is present and presses the surface 10, the error E in the example embodiment can be E=600, for example.

The mechanical construction, electrical implementation and measurement noise dictate the predefined threshold H which can be used to determine whether physical contact with a human finger exists. If a physical contact exists, $$E \geq H. \quad (5)$$

If physical contact does not exist, $$E < H. \quad (6)$$

For the example configuration, we used H=150.

Due to the high sensitivity of piezoelectric sensors, the example embodiment is able to detect forces with a resolution of roughly 1-10 mN, which is enough for detecting even very slight contacts with a human finger and its vibration.

In other words, the limit, when a signal can be considered as "highly stable" or "sufficiently stable" may be defined depending on the actual implementation. In the example configuration, when the total error E<150, the signal is considered as highly stable. For E<150, the signal amplitude variation has to be less than 0.5% of the total measurement range.

A more robust commercial implementation may of course use higher sampling frequency and a low-pass filter for the measured samples with medial filtering to increase the signal to noise ratio.

The device and method can be used in particular in the following applications:

elevator call switches, elevator door controls (open/close), elevator level selectors;

light switches and current switches in buildings;

user interfaces of alarm devices, in particular, fire or burglar alarms;

power switches and user interfaces of home appliances, in particular in dishwashers, washing machines, herds, ovens, herd-oven combinations, microwave ovens, and bathroom furnitures.

The invention claimed is:

1. A device (1) for detecting the presence of at least one human finger on a surface (10), comprising:
    at least one element (22) having piezoelectric characteristics and
        comprising a layer (28) of piezoelectric material on a metallic base plate (25) arranged between a lower conductive layer (18) and an upper conductive layer (14);
        being located under a unitary surface (10), to which the element (22) has been attached by an adhesive layer (12) and which is visible and extends laterally beyond the layer (28) of piezoelectric material and the base plate (29); and
        arranged in the device (1) in such a manner that a force (F) when exerted on the surface (10), such as when the surface (10) is pressed by finger, is transferred to mechanical stress of the element (22), the element (22) then producing a voltage output (V) in response to the mechanical stress, wherein the lower conductive layer (18) encompasses a hole (27) or recess, providing enough room for part of the element (22) to give way when under mechanical stress while the region (30) lower conductive layer (18) directly limiting to the edge of the hole (27) or recess acts as a support surface for the ends (29) of the element (22);
    means (R2, R3, C3, IC1) for measuring the voltage output (V) in a predefined time period; and
    means (IC1) for determining the degree of stability of the measured voltage output (V), configured to indicate that:
        i) if the degree of stability shows that the measured voltage output is stable, a physical contact between a human finger and the surface (10) does not exist; and
        ii) if the degree of stability shows that the measured voltage output is not stable but contains vibrations characteristic to a human finger, a physical contact between a human finger and the surface (10) does exist.

2. A device (1) according to claim 1, wherein: the element (22) having piezoelectric characteristics is arranged between the upper conductive layer (14) that is attached to the surface (10) from below the surface (10), and the lower conductive layer (18) that is attached to a base plate (20), the upper conductive layer (14) serving as an electrical contact to a top electrode of the element (22) and the lower conductive layer (18) serving as electrical contact to the bottom of the element (22).

3. A device (1) according to claim 1, wherein: the hole (27) or recess is circular.

4. A device (1) according to claim 1, wherein: the hole (27) or recess has been manufactured to the lower conductive layer (18), in particular by drilling or etching.

5. A device (1) according to claim 1, wherein: the element (22) having piezoelectric characteristics is or comprises a ceramic piezoelectric element, a crystal piezoelectric element, or a polymer construction that exhibits piezoelectric characteristics.

6. A device (1) according to claim 1, wherein: the element (22) has been arranged in the device (1) in such a manner that a force (F) when exerted in the surface (10), such as when the surface (10) is pressed by finger, is transferred to mechanical stress of the element (22) by bending the element (22).

7. A device (1) according to claim 1, wherein: the means (R2, R3, C3, IC1) for measuring the voltage output (V) in a predefined time period and the means (IC1) for determining the degree of stability of the measured voltage output (V) comprise a microcontroller (IC1) which further comprises an analog-to-digital converter for converting the voltage output (V) which is an analog signal to a digital signal which is then analyzed using software algorithms in the microcontroller (IC1).

8. A device (1) according to claim 1, wherein: the device (1) is a sensor or a part of a sensor.

9. The method of using a device (1) according to claim 1 in the user interface of a machine or a device, in particular of a portable device, wherein: the device (1) is used to indicate whether a physical contact between a human finger and the surface (10) of the user interface exists or not, and preferably also to measure insertion force which corresponds to the force (F) with which the at least one finger presses the surface (10).

10. The method of claim 9, wherein: the device (1) is used to accomplish a capacitive touch sensor which is adapted to detect the presence of a human finger, an inductive touch sensor which is adapted to sense the human touch by measuring the change in forces projected to the surface of the user interface, or a piezoelectric touch sensor which reacts to changes of forces and is adapted to sense the human touch by measuring the change in forces projected to the surface of the user interface.

11. The method of claim 9, wherein: the device (1) is used to signal the beginning and the end of a human finger interaction with the user interface.

12. A device (1) according to claim 1, wherein: the device (1) comprises a dot (26) that is configured to pretension the layer (28) of piezoelectric material.

13. A device (1) according to claim 12, wherein: the dot (26) is configured to ensure an electrical contact between the layer (28) of piezoelectric material and the upper conductive layer (14).

14. A device (1) according to claim 1, wherein: the upper conductive layer (14) is a conductive foil and/or the lower conductive layer (18) is a copper layer that optionally has a gold plating.

15. A device (1) for detecting the presence of at least one human finger on a surface (10), comprising:
at least one element (22) having piezoelectric characteristics and
comprising a layer (28) of piezoelectric material on a metallic base plate (25) arranged between a lower conductive layer (18) and an upper conductive layer (14);
being located under a unitary surface (10), to which the element (22) has been attached by an adhesive layer (12) and which is visible and extends laterally beyond the layer (28) of piezoelectric material and the base plate (29); and
arranged in the device (1) in such a manner that a force (F) when exerted on the surface (10), such as when the surface (10) is pressed by finger, is transferred to mechanical stress of the element (22), the element (22) then producing a voltage output (V) in response to the mechanical stress;
wherein the device (1) comprises a dot (26) that is configured to pretension the layer (28) of piezoelectric material;
means (R2, R3, C3, IC1) for measuring the voltage output (V) in a predefined time period; and
means (IC1) for determining the degree of stability of the measured voltage output (V), configured to indicate that:
  i) if the degree of stability shows that the measured voltage output is stable, a physical contact between a human finger and the surface (10) does not exist; and
  ii) if the degree of stability shows that the measured voltage output is not stable but contains vibrations characteristic to a human finger, a physical contact between a human finger and the surface (10) does exist.

16. A device (1) according to claim 15, wherein: the element (22) having piezoelectric characteristics is arranged between the upper conductive layer (14) that is attached to the surface (10) from below the surface (10), and the lower conductive layer (18) that is attached to a base plate (20), the upper conductive layer (14) serving as an electrical contact to a top electrode of the element (22) and the lower conductive layer (18) serving as electrical contact to the bottom of the element (22).

17. A device (1) according to claim 15, wherein: the lower conductive layer (18) encompasses a hole (27) or recess, providing enough room for part of the element (22) to give way when under mechanical stress while the region (30) lower conductive layer (18) directly limiting to the edge of the hole (27) or recess acts as a support surface for the ends (29) of the element (22).

18. A device (1) according to claim 17, wherein: the hole (27) or recess is circular.

19. A device (1) according to claim 17, wherein: the hole (27) or recess has been manufactured to the lower conductive layer (18), in particular by drilling or etching.

20. A device (1) according to claim 15, wherein: the element (22) having piezoelectric characteristics is or comprises a ceramic piezoelectric element, a crystal piezoelectric element, or a polymer construction that exhibits piezoelectric characteristics.

21. A device (1) according to claim 15, wherein: the element (22) has been arranged in the device (1) in such a manner that a force (F) when exerted in the surface (10), such as when the surface (10) is pressed by finger, is transferred to mechanical stress of the element (22) by bending the element (22).

22. A device (1) according to claim 15, wherein: the means (R2, R3, C3, IC1) for measuring the voltage output (V) in a predefined time period and the means (IC1) for determining the degree of stability of the measured voltage output (V) comprise a microcontroller (IC1) which further comprises an analog-to-digital converter for converting the voltage output (V) which is an analog signal to a digital signal which is then analyzed using software algorithms in the microcontroller (IC1).

23. A device (1) according to claim 15, wherein: the device (1) is a sensor or a part of a sensor.

24. The method of using a device (1) according to claim 15 in the user interface of a machine or a device, in particular of a portable device, wherein: the device (1) is used to indicate whether a physical contact between a human finger and the surface (10) of the user interface exists or not, and preferably also to measure insertion force which corresponds to the force (F) with which the at least one finger presses the surface (10).

25. The method of claim 24, wherein: the device (1) is used to accomplish a capacitive touch sensor which is adapted to detect the presence of a human finger, an inductive touch sensor which is adapted to sense the human touch by measuring the change in forces projected to the surface of the user interface, or a piezoelectric touch sensor which reacts to changes of forces and is adapted to sense the human touch by measuring the change in forces projected to the surface of the user interface.

26. The method of claim 24, wherein: the device (1) is used to signal the beginning and the end of a human finger interaction with the user interface.

27. A device (1) according to claim 15, wherein: the dot (26) is configured to ensure an electrical contact between the layer (28) of piezoelectric material and the upper conductive layer (14).

28. A device (1) according to claim 15, wherein: the upper conductive layer (14) is a conductive foil and/or the lower conductive layer (18) is a copper layer that optionally has a gold plating.

* * * * *